US011161766B2

(12) United States Patent
Ortner et al.

(10) Patent No.: US 11,161,766 B2
(45) Date of Patent: Nov. 2, 2021

(54) METHOD AND DEVICE FOR SEPARATION OF GLASS PORTIONS OR GLASS CERAMIC PORTIONS

(71) Applicant: SCHOTT AG, Mainz (DE)

(72) Inventors: Andreas Ortner, Gau-Algesheim (DE); Albrecht Seidl, Niedernberg (DE); Frank-Thomas Lentes, Bingen (DE); Fabian Wagner, Mainz (DE)

(73) Assignee: SCHOTT AG, Mainz (DE)

( * ) Notice: Subject to any disclaimer, the term of this patent is extended or adjusted under 35 U.S.C. 154(b) by 543 days.

(21) Appl. No.: 15/871,728

(22) Filed: Jan. 15, 2018

(65) Prior Publication Data

US 2018/0134604 A1    May 17, 2018

Related U.S. Application Data

(63) Continuation of application No. PCT/EP2016/066663, filed on Jul. 13, 2016.

(30) Foreign Application Priority Data

Jul. 15, 2015  (DE) .......................... 102015111491.7

(51) Int. Cl.
C03B 33/02      (2006.01)
B23K 26/53     (2014.01)
(Continued)

(52) U.S. Cl.
CPC ...... *C03B 33/0222* (2013.01); *B23K 26/0624* (2015.10); *B23K 26/53* (2015.10);
(Continued)

(58) Field of Classification Search
CPC ..................................................... C03B 33/00
See application file for complete search history.

(56) References Cited

U.S. PATENT DOCUMENTS

2007/0051706 A1*  3/2007  Bovatsek ........... B23K 26/0617
                                                                219/121.69
2007/0111481 A1    5/2007  Tamura
                    (Continued)

FOREIGN PATENT DOCUMENTS

DE    102012110971    5/2014
EP       1742253         1/2007
                    (Continued)

OTHER PUBLICATIONS

Written Opinion of the International Search Authority dated Jan. 10, 2017 for corresponding PCT/EP2016/066663.
(Continued)

*Primary Examiner* — Cynthia Szewczyk
(74) *Attorney, Agent, or Firm* — Ohlandt, Greeley, Ruggiero & Perle, L.L.P.

(57) ABSTRACT

A method is provided that includes producing filamentary damages in a volume of a glass or glass ceramic element adjacently aligned along a separation line and extend obliquely relative to a surface of the glass or glass ceramic element; and separating a portion from the glass or glass ceramic element along the separation line. The step of producing the filamentary damages includes directing laser pulses of an ultrashort pulse laser obliquely on the surface so that the laser pulses have a light propagation direction that extends obliquely relative to the surface and so that the filamentary damages resulting from the laser pulses have the longitudinal extension that extends obliquely relative to the surface; generating a plasma within the volume with the laser pulses; and displacing the laser pulses at points of incidence over the surface along the separation line.

20 Claims, 7 Drawing Sheets

(51) Int. Cl.
*B23K 26/0622* (2014.01)
*B32B 17/00* (2006.01)
*B23K 103/00* (2006.01)

(52) U.S. Cl.
CPC .......... *B32B 17/00* (2013.01); *B23K 2103/54* (2018.08); *Y10T 428/24777* (2015.01)

(56) References Cited

U.S. PATENT DOCUMENTS

| | | | |
|---|---|---|---|
| 2013/0126573 A1* | 5/2013 | Hosseini | ............ B23K 26/0622 |
| | | | 225/2 |
| 2014/0027951 A1 | 1/2014 | Srinivas | |
| 2014/0199519 A1 | 7/2014 | Schillinger | |
| 2015/0034613 A1 | 2/2015 | Hosseini | |
| 2015/0038313 A1* | 2/2015 | Hosseini | ................ B23K 26/38 |
| | | | 501/32 |
| 2015/0118522 A1 | 4/2015 | Hosseini | |
| 2015/0136743 A1 | 5/2015 | Hosseini | |
| 2015/0165560 A1 | 6/2015 | Hackert | |
| 2015/0166393 A1 | 6/2015 | Marjanovic | |
| 2016/0016257 A1 | 1/2016 | Hosseini | |
| 2016/0031745 A1 | 2/2016 | Ortner | |
| 2016/0280580 A1 | 9/2016 | Bohme | |

FOREIGN PATENT DOCUMENTS

| | | |
|---|---|---|
| EP | 1811550 | 7/2007 |
| EP | 2754524 | 7/2014 |
| EP | 2781296 | 9/2014 |
| WO | 2012006736 | 1/2012 |
| WO | 2015075059 | 5/2015 |
| WO | 2016010991 | 1/2016 |

OTHER PUBLICATIONS

English translation of International Search Report dated Jan. 19, 2017 for corresponding PCT/EP2016/066663.

* cited by examiner

METHOD AND DEVICE FOR SEPARATION OF GLASS PORTIONS OR GLASS CERAMIC PORTIONS

CROSS REFERENCE TO RELATED APPLICATIONS

This application is a continuation of International Application No. PCT/EP2016/066663 filed on Jul. 13, 2016, which claims the benefit under 35 U.S.C. § 119(a) of German Application No. 10 2015 111 491.7 filed Jul. 15, 2015, the entire contents of both of which are incorporated herein by reference.

BACKGROUND OF THE INVENTION

1. Field of the Invention

The invention generally relates to the separation of glass portions, such as glass portions from glass plates. More particularly, the invention relates to the separation of glass portions using a laser-assisted method.

2. Description of Related Art

From WO 2012/006736 A2 it is specifically known that high-energy laser pulses can be used to cause a formation of filaments in glass, as irreversible damages. An aligned series of such damages in glass allows to separate transparent substrates. A filament is produced by an ultrashort laser pulse which causes self-focusing to take place inside the glass due to the Kerr effect until energy density becomes so high at some point that a plasma is ignited. A plasma explosion occurs, during which the glass undergoes irreversible damage around this plasma generation site. From there, further radiation will emanate and will be subject to self-focusing and terminate in a plasma explosion. This effect is repeated several times, depending on intensity. The energy decreases across the entire glass thickness, so the first plasma spots will have the greatest energy and also produce the greatest damage.

DE 10 2012 110 971 A1 describes a method for preparing separation of transparent workpieces, in which filamentary structures are produced by ultrashort laser pulses along a predetermined breaking line, which filamentary structures extend across the workpiece and are aligned next to each other. In a subsequent step, separation of the workpiece is effected. The method creates a breaking line without producing a separation gap or groove.

US 2015/0034613 A1 describes optics and arrangements for introducing oblique filaments or preliminary defects, i.e. which are not aligned perpendicular to the substrate surface the light beam crosses first. By using suitable optical elements such as x-y scanners, filaments are introduced in this way, which lie on the surface of a truncated cone, which allows for easier release of the inner portion of the substrate geometrically defined in this manner. Furthermore, this document describes the use of the filaments obliquely introduced into the substrate near the edge of the substrate for providing the substrate with a chamfer. Different variants are mentioned for providing a chamfer on a sheet glass, such as for example the provision of a one- or two-sided chamfer at the edge or the creation of a tip over the center of the edge.

In order to achieve an overall greater depth of cut, WO 2015/075059 A1 describes an arrangement in which a plurality of material modifications are produced in the substrate, which modifications are arranged one above the other.

In a further development, WO 2016/010991 A1 seeks to avoid the disadvantages of refraction of the laser beam at the first substrate surface by placing a prism on the substrate, which has surfaces provided with an anti-reflective coating for the employed laser wavelength and a wedge angle chosen such that the side facing the laser beam is oriented perpendicular to the orientation of the beam and such that an oblique perforation can be produced in the substrate near the edge thereof.

A drawback which all the described prior art methods have in common is that the length of the produced filaments decreases with increasing angle of incidence of a laser beam that is incident obliquely on the first substrate surface and with increasing depth in the substrate of the starting point of the filament in the substrate.

Further drawbacks are resulting therefrom for the subsequent separation along the introduced linear modifications:

If the separation line is rectilinear, then the separation following the laser processing will be simple. However, separation will be more difficult if the separation line is curved, has several sections at an angle to one another, or even forms a closed loop. The latter case is given, inter alia, when an inner contour or a hole is to be made. For example, this is the case when a window is to be cut into a glass plate. This is also the case when a glass part is to be produced which has an outer contour that is completely defined by the separation line.

The separation along separation lines that have a generally curved shape, angled sections, or which even define a closed loop is difficult because it is not readily feasible to exert a sufficient bending moment onto the glass along the separation line, and because no groove or separation gap is formed. The problem is even more aggravated with increasing glass thickness.

SUMMARY

Accordingly, the invention is based on the object to enable a neat separation of glass portions along such a non-rectilinear separation line.

The invention is generally very well suitable to be applied for brittle, especially glass-containing materials. Materials which come into question for the invention are therefore in particular glass and glass ceramics. In addition, the method is also suitable for processing and separating in the respective wavelength ranges of transparent dielectrics.

The precision separation method for glass, according to which defined damages are generated within a very small space using ultrashort pulse lasers and which is employed for the invention in based on a local deterioration of the glass in the interaction zone with the laser light by producing closely spaced sub-micrometer hollow channels, that is to say hollow channels with diameters of less than 1 micrometer.

Below, these sub-micrometer hollow channels will be referred to as filament-like or filamentary damages, without necessarily having a true filamentation process according to WO 2012/006736 A2. On the contrary, the laser radiation is preferably introduced into the glass or glass ceramic using a beam shaping system and in such a way that this linear damage zone is produced deterministically. For providing the beam geometry, known optical systems can be used as well as externally fed beams, e.g. beam-shaping systems with strong spherical aberration, or Bessel beams.

The method according to the invention for separating portions from glass or glass ceramic elements is specifically based on producing filamentary damages which are elongated along the light propagation direction and adjacently aligned along a separation line in the volume of the glass or glass ceramic element, wherein the damages are produced by laser pulses of an ultrashort pulse laser, wherein the material of the glass or glass ceramic element is transparent for the wavelength of the laser pulses, and wherein the laser pulses generate a plasma within the volume of the glass or glass ceramic element which causes the filamentary damages, and wherein the points of incidence of the laser pulses on the glass or glass ceramic element are displaced over the surface thereof along the separation line, wherein the laser pulses, i.e. the laser beam, are directed obliquely onto the surface so that the light propagation direction of the laser pulses and thus also the longitudinal extension of the filamentary damages extends obliquely relative to the surface. Furthermore, the separation line extends obliquely, preferably perpendicular to the light incidence plane in this case. After the filamentary damages extending obliquely relative to the surface have been introduced, a portion is then separated from the glass or glass ceramic element along the separation line at the adjacently aligned filamentary damages.

Thus, in other words, the damage channels are introduced in such a manner that the direction of their longitudinal extension is different from the direction of the surface normal of the glass or glass ceramic element. As a result thereof, an inclined cut or separation surface is defined between the portions to be separated.

In this way, it is basically possible to produce glass or glass ceramic elements with at least one oblique edge, wherein the oblique edge is obtained at the cut or separation surface directly by the separation along the separation line generated according to the invention, without requiring an additional subsequent processing step such as polishing to obtain the oblique edge shape.

According to a refinement of the invention it is contemplated that once the filamentary damages adjacently aligned along the separation line have been introduced, a point of incidence of laser radiation, preferably of a carbon dioxide laser, is displaced over the surface of the glass element along the separation line such that local tensile stresses are caused in the glass along the separation line in order to cause crack formation between adjacent filamentary damages. Such a method step is also referred to as a cleaving step.

A cleaving step is used for preliminary separation. In this case, the glass element is preferably irradiated by a $CO_2$ laser along the separation line in order to generate thermo-mechanical stresses in the glass element at the separation line. This makes it possible to initiate formation of cracks connecting the filamentary damages along the separation line so as to cause severing along the separation line at least in sections thereof.

Both the filament structures per se and additional cracks in the material as caused by a cleaving step are preliminary damages in the material that extend along the separation line.

The microperforation that is employed for the invention does not remove any material from the separation seam, apart from tiny amounts. When the filamentary damages have been introduced, both portions to be separated will still be substantially connected to each other. With increasing glass thickness, the risk of jamming between the glass portions that are still in contact is getting greater and greater, so that reliable separation becomes difficult or even impossible. By using oblique cut lines as contemplated according to the invention, the detachment in particular of inner hole portions is substantially facilitated. Oblique contours of a few degrees up to 10° and more and corresponding oblique breaking edges provide for a detachment without risk of jamming.

In a further embodiment of the invention, the method comprises a special optical configuration in order to likewise obtain oblique edges of the glass or glass ceramic element with an angle of at least 12°, at least 15°, or even more after the separation.

This optical configuration comprises an optical element, preferably for directing the laser beam. This element may comprise a prism in a preferred embodiment. Such a prism is particularly advantageously capable of compensating for an angle of incidence which results between the oblique direction of the laser beam onto the surface of the glass or glass ceramic element and the surface normal. The inclination of the surface of the glass or glass ceramic element facing the laser beam can be substantially compensated thereby. In this way it is possible to cause the laser beam to impinge perpendicular onto the optical element.

The inventors have found that in the case of rather thick workpieces, the generating laser beam might be distorted by refraction with increasing angle of incidence and/or increasing depth of the starting point of the filament. Starting point in this context refers to the point from which the plasma is generated when a laser pulse is incident. Already at an angle of incidence of about 5° or more, this may cause a change in the lateral intensity distribution and formation of secondary maxima around the central intensity maximum, which ultimately leads to reduced filament lengths in the beam direction.

Therefore, it is difficult with prior art methods to process rather thick workpieces that have a thickness of more than about 4 mm when it is desired to produce an oblique cut or separation surface with an angle of greater than 5°, greater than 10°, greater than 12°, greater than 15°, or even greater than 20°.

This drawback can be overcome in a surprisingly simple manner by using the optical element, so that it is also possible to produce thicker glass or glass ceramic elements with oblique edges with an angle relative to the surface normal of more than 5°, more than 10°, more than 12°, more than 15°, or even more than 20°.

DESCRIPTION OF THE DRAWINGS

The invention will now be explained in more detail with reference to the accompanying figures, wherein the same reference numerals designate the same or equivalent elements, and wherein.

DETAILED DESCRIPTION

Figure 1:
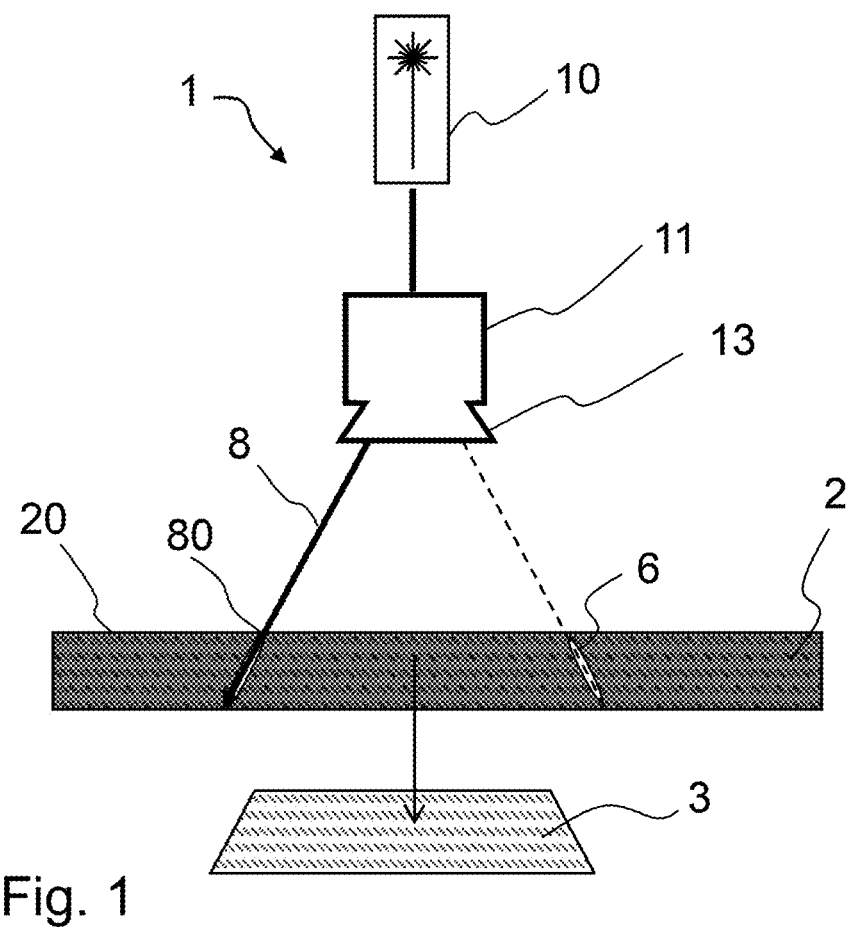
FIG. 1 is a schematic side view of a laser processing device for performing the method of the invention.

For the sake of clarity, the same reference numerals in the following detailed description of preferred embodiments designate substantially similar parts in or at these embodiments. For better illustrating the invention, however, the preferred embodiments shown in the figures are not always drawn to scale.

Figure 2:
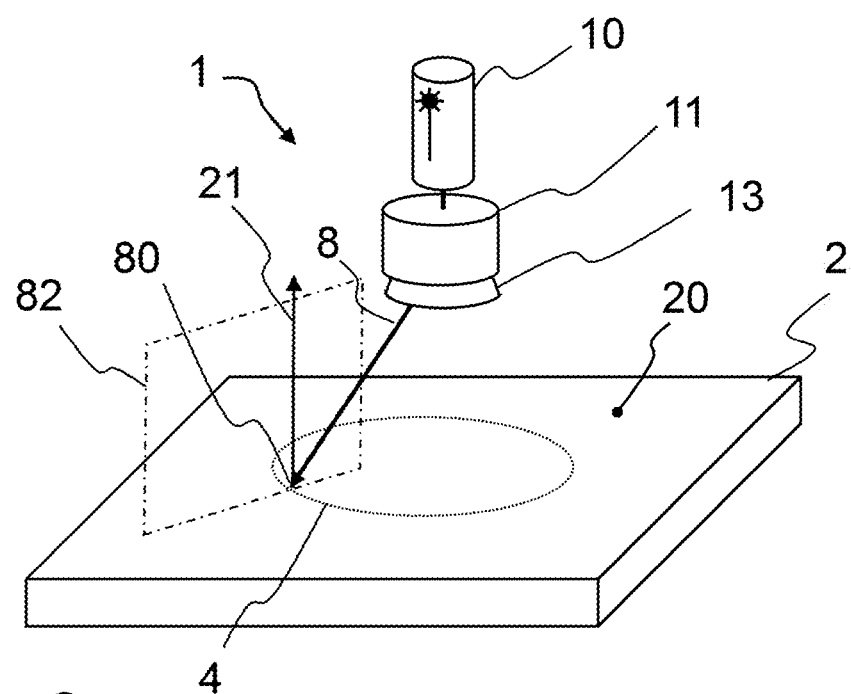
FIG. 2 is a perspective view of the laser processing device.

FIGS. 1 and 2 schematically show a laser processing device 1 which can be used for microperforating a glass or glass ceramic part 2 by introducing filamentary damages and thus preparing it for a subsequent separation of a portion 3 from the element 2.

Laser processing device 1 comprises an ultrashort pulse laser 10 for directing laser pulses 8 onto the glass or glass ceramic part. For this purpose, the laser pulses 8 are directed to the desired direction using a scanner 11 and are focused onto the glass or glass ceramic part by focusing means 13. The wavelength of the ultrashort pulse laser 10 is selected so that the laser pulses 8 can penetrate into the glass or glass ceramic element 2.

The laser pulses 8 thereby generate a plasma in the volume of the glass or glass ceramic element 2 causing the filamentary damages 6. The points of incidence 80 of the laser pulses 8 on the glass or glass ceramic element 2 are successively displaced over the surface 20 along the intended separation line 4.

As can be seen from FIGS. 1 and 2, the laser pulses are in particular directed obliquely onto the surface 20 of the glass or glass ceramic element 2, so that an angle exists between the surface normal 21 and the direction of the laser pulses 8. Thus, the longitudinal extension of the filamentary damage 6 is also obliquely to the surface 20, as shown in FIG. 1. The influence of refraction of the laser light on the surface 20 of glass or glass ceramic element 2 is not illustrated in FIG. 1, for simplifying reasons.

For facilitating the separation of glass portion 3, the angle between the direction of light incidence and the surface normal 21 may range between a few degrees and well over 10°. According to one embodiment of the invention, an angle in a range of 3°, more than 5°, more than 10°, more than 12°, more than 15°, or even more than 20° up to more than 30° is adjusted between the light incidence direction of the laser pulses and the surface normal 21 of the surface 20 of the glass or glass ceramic element 2.

As mentioned above, the separation may be further facilitated by a cleaving step performed after the filamentary damages have been introduced, preferably using a $CO_2$ laser.

As can be seen from FIG. 2, the laser pulses 8 are furthermore directed obliquely onto the surface 20 in such a manner that the light incidence plane 82 is transverse, preferably perpendicular to the separation line 4. Accordingly, the direction of advancement along which the point of incidence 80 is displaced over the surface 20 is also transverse, preferably perpendicular, to the light incidence plane 82. Light incidence plane 82 is spanned by the light incident direction and surface normal 21. If the separation line is curved, for example circular, as in the example shown, the orientation of the separation line 4 transverse to the light incident plane 82 is to be understood as meaning that the tangent to the separation line 4 is transverse, preferably perpendicular, to the light incident plane 82.

Therefore, according to one aspect of the invention, without being limited to the exemplary embodiments, a laser processing device 1 is furthermore provided, for preparing separation of a portion 3 from a glass or glass ceramic element 2, which comprises: an ultrashort pulse laser 10 with a pulse power sufficient to produce filamentary damages 6 within the glass or the glass ceramic by laser pulses 8 focused in the glass or glass ceramic; a holder for a glass or glass ceramic element 2; focusing means for focusing laser pulses 8 generated by the ultrashort pulse laser 10 in a glass or glass ceramic element 2 supported by the holder; and a scanning or displacing means for obliquely directing the laser pulses onto the surface 20 of a glass or glass ceramic element 2 supported by the holder, such that the light propagation direction of the laser pulses and thus also the longitudinal extension of the filamentary damages extend obliquely to the surface 20 and; for displacing the points of incidence of the laser pulses that can be generated by the ultrashort pulse laser over the surface 20 of the glass or glass ceramic element 2 along a separation line 4 in such a manner that the separation line 4 extends obliquely, preferably perpendicular to the light incidence plane 82 and the filamentary damages 6 are generated adjacently aligned along the separation line 4.

In the simplest case, the holder for the glass or glass ceramic element 2 is provided by a support surface. Lateral fixation is not necessarily needed.

In the exemplary embodiment illustrated in FIG. 1 and FIG. 2, the scanning means are provided in the form of a scanner 11. Alternatively or additionally, it is also possible to move the supported glass or glass ceramic element 2 in a manner so that the point of incidence 80 is passed over the surface 20 of the glass or glass ceramic element 2 along the intended separation line 4. It goes without saying that a displacement of the laser beam using a scanner 11 and a displacement of the glass or glass ceramic element 2 using a holder can be combined.

Once the filamentary damages extending obliquely relative to the surface 20 have been introduced, a portion 3 is then separated from the glass or glass ceramic element along the separation line at the adjacently aligned filamentary damages.

For providing the beam geometry, known optical systems can be used as well as externally fed beams, e.g. beam-shaping systems with strong spherical aberration, or Bessel beams.

For obliquely incident beams such as contemplated according to the invention, astigmatic deformation of the beam profile is caused by refraction on the surface of the glass or glass ceramic element 2. The astigmatism can be corrected by a cylindrical lens or another optical device. Therefore, according to one embodiment of the invention, a focusing means 13 is provided which is adapted to compensate an astigmatic deformation of the beam profile of the laser pulses 8 upon entry into the glass or glass ceramic element 2.

According to a preferred embodiment of the invention, without being limited to the exemplary embodiments, the laser pulses 8 produce filamentary damages 6 having a length of at least 200 micrometers, more preferably at least 500 micrometers. Suitable pulse energies and pulse durations are chosen for this purpose.

Particularly advantageous for the generation of long filamentary damages is an operation of the laser 10 in a burst mode. In this operation mode, the laser pulse is not emitted as a single pulse, but as a sequence of pulses emitted in quick succession, which together form a pulse packet, a so-called burst. Accordingly, one embodiment of the invention contemplates an operation of the laser 10 in the form of an emission of laser pulses in time succession, in the form of bursts or pulse packets, wherein each of such bursts preferably generates a respective one of the filamentary damages 6.

Such a pulse packet generally has a slightly higher energy than a single pulse in the conventional single-shot operation. However, the pulses of a burst contain significantly less energy than a single pulse. Furthermore, the pulse energies of the pulses typically decrease within a burst. In certain lasers it is possible to adjust the energy distribution of the pulses within the burst.

A suitable laser source according to the present invention is a neodymium-doped yttrium-aluminum-garnet laser having a wavelength of 1064 nanometers, preferably 532 nanometers, more preferably 355 nanometers. The laser source in particular operates at a repetition rate between 10 kHz and 120 kHz, preferably between 30 kHz and 110 kHz, and most preferably between 35 kHz and 105 kHz. The scan rate can preferably be chosen such that, depending on the repetition rate, the spacing between adjacent filamentary damages will be in a range from 4 micrometers to 10 micrometers.

In this case, the suitable pulse duration of a laser pulse is in a range of less than 100 picoseconds, preferably less than 10 picoseconds. The pulse duration may even be less than 1 picosecond. Most favorably, the laser source is operated at a typical power in a range from 40 to 100 watts. According to one advantageous embodiment of the invention, a pulse energy of more than 200 microjoules is applied in the burst, and furthermore advantageously a total burst energy of more than 500 microjoules, in order to achieve the filamentary damages.

The laser source is most favorably operated at a power in a range from about 7 to 12 watts.

The laser energy deposited in the glass is >80 µJ, preferably >100 µJ, and most preferably >150 µJ.

In case the ultrashort pulse laser 10 is operated in the burst mode, the repetition rate is the rate of repeated burst emission. The pulse duration is essentially independent of whether a laser is operated in the single-pulse mode or in the burst mode. The pulses within a burst typically have a similar pulse length as a pulse in the single-pulse mode.

In the case of thicker glass or glass ceramic elements 2, it is usually no longer possible or at least unfavorable to perform the microperforation over the entire thickness in a single processing step or by passing the point of incidence 80 along the separation line 4 only once. Rather, in order to provide for a simple and reliable separation of the glass portion it is favorable to perform two or more passes in different focal depths. For a vertical incidence of the laser beam this presents no problem. In the case of oblique cut edges and multiple passes at different focal depths as intended according to the invention, however, the microchannels will no longer be collinear one behind the other but will be offset, depending on the angle of incidence and focus position. This offset can amount to several tens of micrometers. Therefore, separation will be considerably more difficult or an undesirable profile of the breaking edge will be resulting.

Therefore, another object of the invention is to specify an algorithm for compensating the lateral offset as a function of the angle of incidence, the focal position, and the material to be processed.

Thus, according to one embodiment of the invention, the offset is compensated in such a manner that the filamentary damages are generated at different depths and so that their longitudinal extensions lie in a common plane. This initially merely imaginary plane defines the breaking edge after the separation. Due to the compensation, the points of incidence will have a different spacing from the separation line 4, depending on the depth of the filamentary damage 6.

If the multi-layer separation process is started at the greatest depth, modifications of the material (e.g. a change in the refractive index) may already arise at lower depths, depending on the properties of the glass with respect to the nonlinear interaction with the incident ultrashort laser radiation, which causes a slight deflection of the laser beam so that no common connecting surface will be resulting after the individual passes. Therefore, a small predefined offset will usually even be desirable. This offset is preferably in a range from a few micrometers to maximal 50 µm.

In this case, the angles of incidence relative to the surface normal of the surface 20 of glass or glass ceramic element 2, the refractive index of glass or glass ceramic element 2, the focal depth, and the lateral offset are adjusted relative to each other in coordinated manner such that a collinear microchannel formation is resulting, i.e. such that the filamentary damages that are created in different depths lie on a common separation surface. In particular for this purpose, it is possible according to one embodiment of the invention to correct the lateral position of the point of incidence 80 of the laser pulses as a function of the focal depth. The lateral position is in particular the position in the direction of the intersection line between the light incidence plane 82 and the surface 20 of the glass or glass ceramic element. The lateral position may as well be expressed as a spacing from the separation line 4.

More generally, according to this embodiment of the invention, the points of incidence 80 of the laser pulses 8 on the glass or glass ceramic element 2 are passed at least twice over the surface 20 thereof in the direction along the separation line 4, i.e. during at least two passes, and for each pass the focal depth is modified in order to introduce filamentary damages 6 into the glass or glass ceramic element 2 at different depths.

According to one embodiment of the invention, the inclination angle and/or the lateral offset of the laser beam are then adjusted for the passes in such a way that the created microchannels (perforation channels) or filamentary damages 6 are arranged collinearly in terms of their longitudinal extension, without lateral offset in the beam direction. With the collinear or offset-free alignment of the filamentary damages, a separation surface free of offsets is produced in this way.

Figure 3:
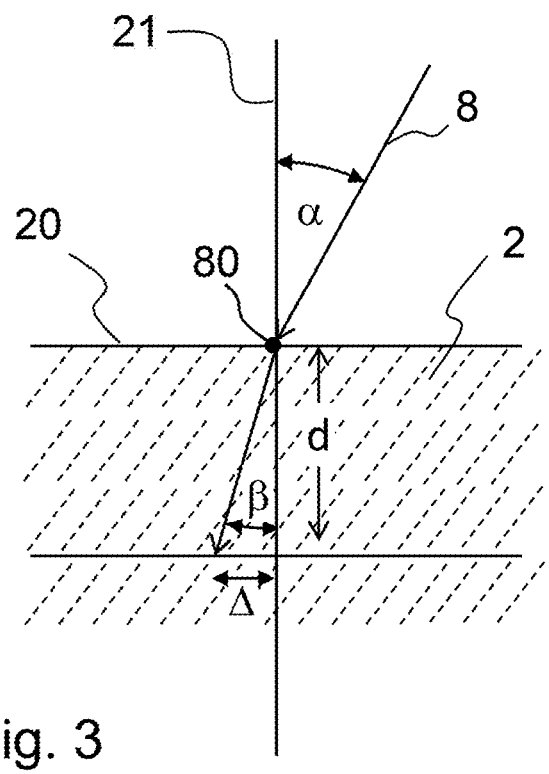
FIG. 3 is a schematic sectional view illustrating the refraction of laser pulses in the glass or glass ceramic element.

FIG. 3 is a schematic sectional view illustrating the refraction of laser pulses 8 in the glass or glass ceramic element 2. As can be seen from the diagram, at a light incidence angle α, the laser pulse 8 will be offset laterally relative to the point of incidence 80 by a distance or offset Δ, at a depth d. Due to refraction, the following relationship applies for the angle β relative to the surface normal 21 inside the glass or glass ceramic article 2: sin β=(1/n)·sin α, wherein n is the refractive index of the material of the glass or glass ceramic element 2. For the offset Δ at the depth d, the following is resulting: Δ=d·tan β, or Δ=d·tan·(arcsin((1/n)·sinα)).

If now the focal depth is varied by a distance d, and if the angle of incidence α also changes due to the modified focal depth, the desired offset Δ can be produced by a lateral displacement of the point of incidence 80, according to the relationship given above.

Figure 4:
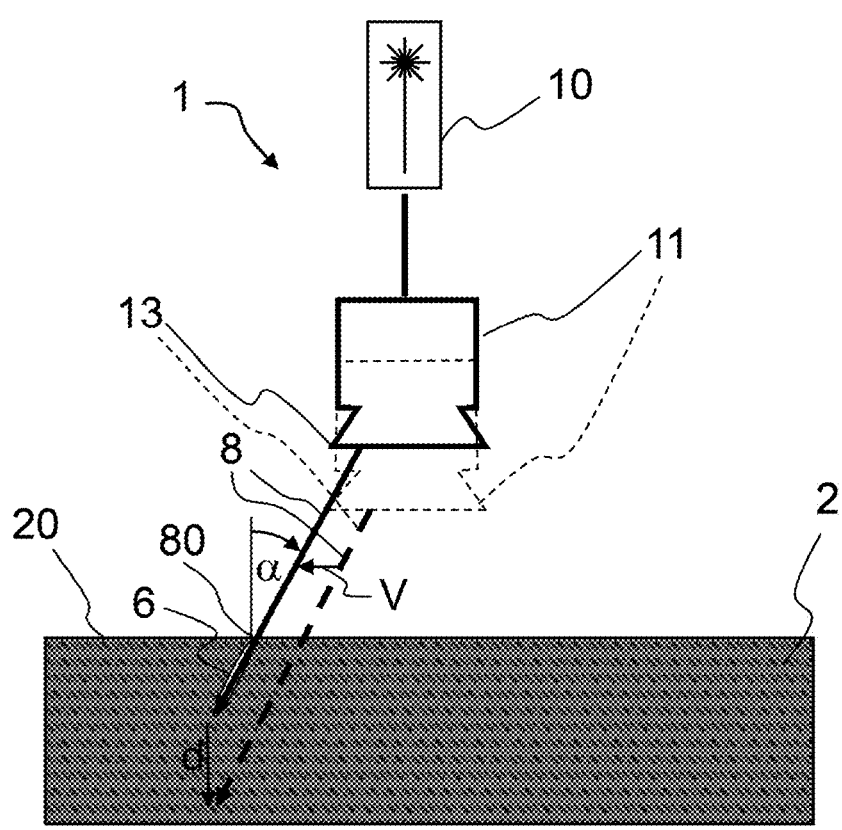
FIG. 4 is a schematic view illustrating the introduction of filamentary damages at different depths.

For explanatory reasons, the scanner with focusing means is indicated twice in FIG. 4, at different distances from the glass or glass ceramic element 2. Due to the different distance, different focal depths are resulting. If a respective pass of the points of incidence along the separation line 4 is performed with the different distances and hence different focal depths, the corresponding filamentary damages 6 will also lie at different depths. If only the distance is changed, as illustrated, the angle of incidence α will substantially be the same for the passes. However, as can be seen, for the position of focusing means 13 closer to the glass or glass ceramic element, as drawn in dashed lines, the laser beam does not extend collinear anymore to the laser beam in case of the higher position of the focusing means 13 as drawn in solid lines.

In order for the laser pulses 8 to extend collinearly in the glass or glass ceramic element 2 so that the filamentary damages 6 introduced at different depths also lie one behind the other, without lateral offset, the lateral position of the point of incidence 80 is furthermore modified by a distance V. As can be seen from FIG. 4, for a given angle of incidence and an increase in focal depth by an amount d, the point of incidence 80 of the laser pulse is shifted by a distance V. The following relationship applies to the offset or shift V perpendicular to the separation line, the vertical shift d of the focus, and the angle of incidence α: V/d=tan α. As a result of the correction by the offset V, the points of incidence 80 will lie on a straight line during the different passes.

Thus, according to one embodiment of the invention, at least two passes will be performed along the separation line 4, and for a respective pass the focal depth is modified compared to a previous pass, while the position of the point of incidence 80 is shifted as a function of the focal depth such that the focal points lie on a line during the passes. In particular, according to the aforementioned relationship, the focal point is shifted by an amount of V=d·tan α in a direction perpendicular to the separation line.

Due to the processing according to the invention, some particularities are furthermore resulting on the glass or glass ceramic article 2 processed according to the invention: Once the portion 3 has been severed, portion 3 will have an inclined circumferential surface or edge surface which is formed by the breaking surface during separation.

Since the breaking occurs along the filamentary damages 6, these damages 6 are also present in the surface of the inclined edge surface. The remaining part from which portion 3 was separated also has such an inclined or chamfered edge surface with filamentary damages in the surface.

Figure 5:
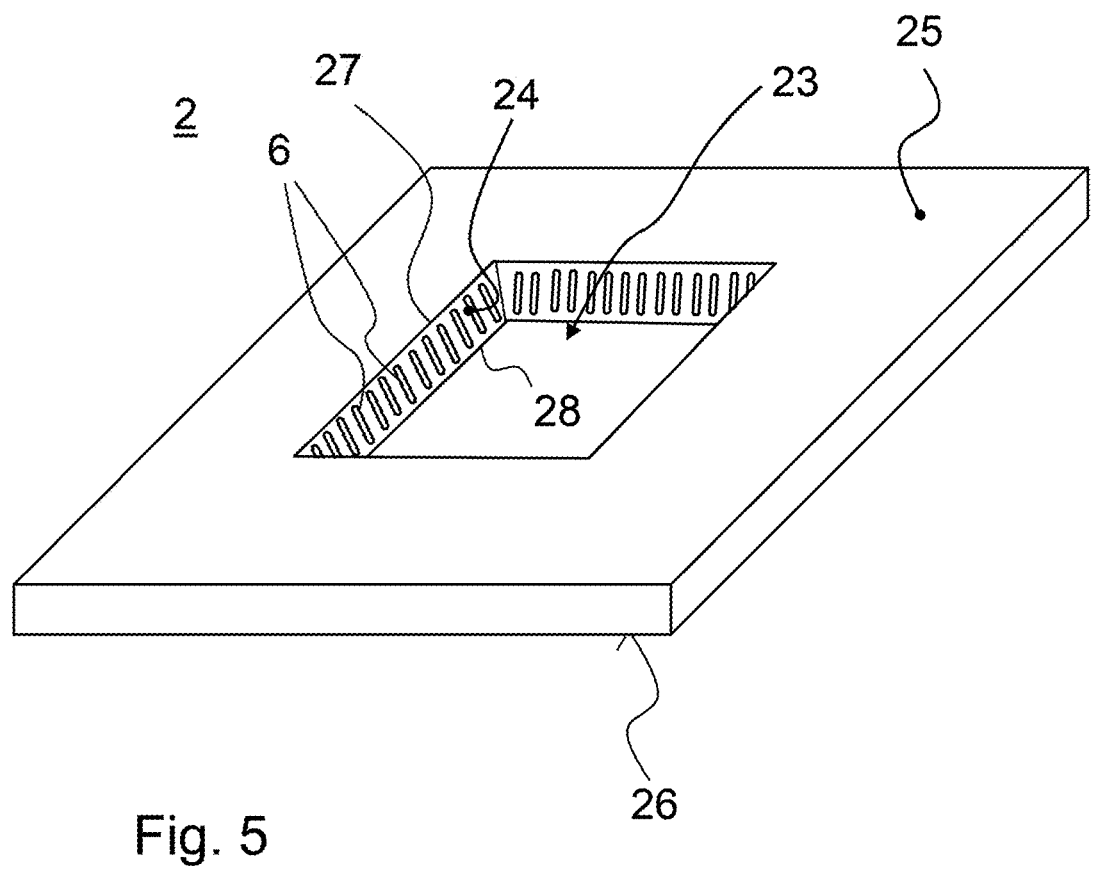
FIG. 5 shows a glass or glass ceramic element with an opening delimited by a circumferential edge surface.

FIG. 5 shows a first example for this case, namely a plate- or sheet-like glass or glass ceramic element 2 that can be produced according to the invention.

Although the invention is also applicable to rectilinear separation lines, the particular advantages arise especially in the case of curved or polygonal separation lines, as explained above. The edge surface of the glass or glass ceramic article 2 processed according to the invention is preferably a closed circumferential surface, or the start and end sections of the edge surface enclose an angle of at least 75°, preferably at least 85°. The edge surface 24 adjoins the faces 25, 26 at edges 27, 28.

The example shown in FIG. 5 illustrates a particularly preferred application case in which a window or an opening 23 was produced in the glass or glass ceramic element 2 by separating a portion along a closed-loop separation line. Accordingly, the opening is bounded by a circumferential edge surface 24.

Furthermore, the filamentary damages 6 extend transversely, preferably perpendicular to the edges between edge surface 24 and the two opposite faces 25, 26. Since the separation of the glass portion is effected emanating from the filamentary damages 6, each respective edge surfaces of the glass portions produced by the separation will include a respective half of these damages, in the ideal case. In any case, the filamentary damages 6 form indentations in the edge surface 24.

As can be seen from FIG. 5, it is not necessary for a glass or glass ceramic element 2 according to the invention to have all edge surfaces formed as described above. For example, if an inner contour or an opening 23 is created by the processing, the latter will then have an edge surface 24 in addition to the already existing outer edge surface.

Irrespectively of the particular design of the example shown in FIG. 5, and also irrespectively of whether the edge surface 24 is an outer edge or an inner edge of an opening, as illustrated, the direction of inclination along the edges remains the same. Thus, when moving along one of the edges, the edge surface along this edge is inclined either clockwise or counterclockwise. Consequently, the direction of inclination of the edge surface 24 will always point to the same edge 27, or 28. In the case of an opening 23 in the glass or glass ceramic element bounded by edge surface 24, this results in the fact that one of the edges 27, 28 (edge 28 in the illustrated example) protrudes further into the opening than the other edge. If the edge surface 24 forms an outer edge of the glass or glass ceramic element 2, by contrast, one of the edges 27, 28 will accordingly protrude further outwards.

Accordingly, without being limited to the specific example shown in FIG. 5, the method of the invention allows to produce a sheet-like glass or glass ceramic element 2 which has two opposite faces 25, 26 and an edge surface 24 connecting these two faces 25, 26, preferably a circumferential edge surface 24, wherein the edge surface 24 has adjacently aligned filamentary damages 6 forming indentations in the edge surface 24, wherein the longitudinal extension of the filamentary damages 6 is in the direction from one edge to the other edge 27, 28 which define the transition between the edge surface 24 and the faces 25, 26, preferably perpendicular to the edges 27, 28, and wherein the edge surface 24 is inclined relative to the faces 25, 26, and wherein the direction of inclination of the edge surface 24 relative to the faces 25, 26 is consistent along an edge 27, 28. Although the direction of inclination remains the same, this is not necessarily true for the angle of inclination. Preferably, the glass or glass ceramic element 2 has an opening 23 which is delimited by the circumferential edge surface 24.

In the case of an opening 23, the opening 23 will generally taper toward one of the faces 25, 26 as a result of this inclination. Also, in the opposite case, where the edge surface 24 forms an outer edge, the glass or glass ceramic element will taper from one face toward the other as a result of the inclination or bevel.

As already stated above, the angle of light incidence is preferably in a range from 3° to 30°, more preferably in a range of 3°, more than 5°, more than 10°, more than 12°, more than 15°, or even more than 20° up to more than 30°. Also, preferably, the angle of light incidence is at least 5° in order to obtain a sufficiently inclined edge surface 24. This angle which then determines the inclination of the edge surface 24 becomes slightly smaller due to the refraction on the surface 20 of the glass or glass ceramic element 2 towards the perpendicular. Preferably, however, an inclination of at least 3°, more preferably at least 5° relative to the perpendicular or to the normal 21 of the surface 20 or to one of faces 25, 26 is also intended for the edge surface 24. Furthermore, the angle of inclination is preferably at most 55°, more preferably at most 50°.

The width of the filamentary damages produced by the method of the invention is typically less than 20 µm. Preferably, the width is even less than 10 µm. This is associated with the fact that, typically, the depth of the indentations formed by the filamentary damages 6 in the edge surface is also less than 20 µm, preferably less than 10 µm. As stated above, the filamentary damages have a length of generally at least 200 micrometers, preferably at least 500 micrometers.

Figure 6:
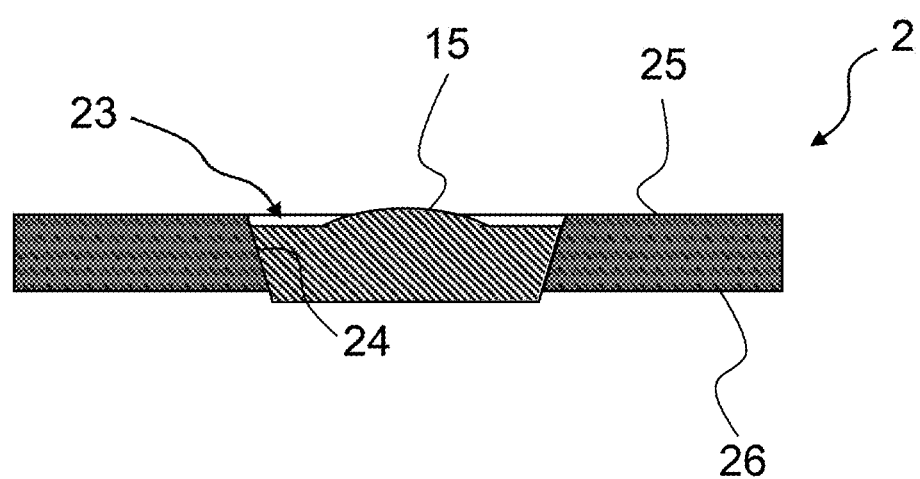
FIG. 6 shows a glass or glass ceramic element with inclined edge surfaces and an inserted switch button.

The special design of the edge surface 24 is not only favorable for the separation of the portion to be removed from the glass or glass ceramic element 2 along an angled or curved separation line. Rather, there are also special advantages for the further processing of the glass or glass ceramic element 2. In the case of an opening with the inclined or oblique edge surface 24 on all sides, exact fitting of components, such as electrical or electronic components is facilitated. The filamentary damages 6 in the form of indentations in the edge surface 24 will then moreover provide for a good anchoring of the component, for example by adhesive bonding. For this case, FIG. 6 shows a cross-sectional view of an example of a glass or glass ceramic element 2 with a switch button 15 inserted in an opening 23 produced according to the invention. As a result of the inclination of the edge surface 24 of the opening 23 on all sides, the opening 23 tapers towards face 26, as in the example shown in FIG. 5. If the face 25 defines the operation side from which switch 15 is accessible to a user, the switch 15 will be firmly anchored in the opening as a result of the tapered shape of the opening 23, and even if a high pressure is exerted on switch 15 it cannot be pushed through the opening 24. If switch 15 is mounted by adhesive bonding, the glue can penetrate into the indentations 6 (not shown in FIG. 6 for the sake of simplicity) and can thus improve the anchoring of the component mounted in the opening 23, such as a switch 15 or else an electrical display element, for example.

More generally, it is therefore contemplated according to one refinement, that at least one opening 23 is provided which is bounded by the edge surface 24, and that at least one electrical or electronic element is anchored in the opening 23, preferably an actuating element such as switch 15, and/or an electrical display element. As mentioned above, the anchoring can be achieved by an adhesive bond, for example. It is of course also possible to combine a switch 15 and a display element, for example in the form of an illuminated switch button 15.

Moreover, it is possible to modify the method such that due to the offset from pass to pass, a stepped, sort of "cake-like" layering is resulting, which also helps to facilitate the detachment of the inner, on all sides surrounded glass portion. Such a cake-like or stepped layering is shown in FIG. 7.

For this purpose, it is contemplated according to a further embodiment of the invention to produce filamentary damages in the volume of the glass element adjacently aligned along an offset line which is spaced apart from the separation line by at least 5 and at most 50 micrometers, preferably at most 40, more preferably at most 30 micrometers, wherein a projection of these filamentary damages onto the longitudinal extension of the filamentary damages produced along the separation line exhibits an overlap of less than 200 micrometers, preferably less than 100 micrometers, more preferably less than 50 micrometers with the filamentary damages produced along the separation line.

Furthermore, in similar manner, filamentary damages can be generated in the volume of the glass element along a second offset line that is spaced apart from the first offset line.

Figure 7:
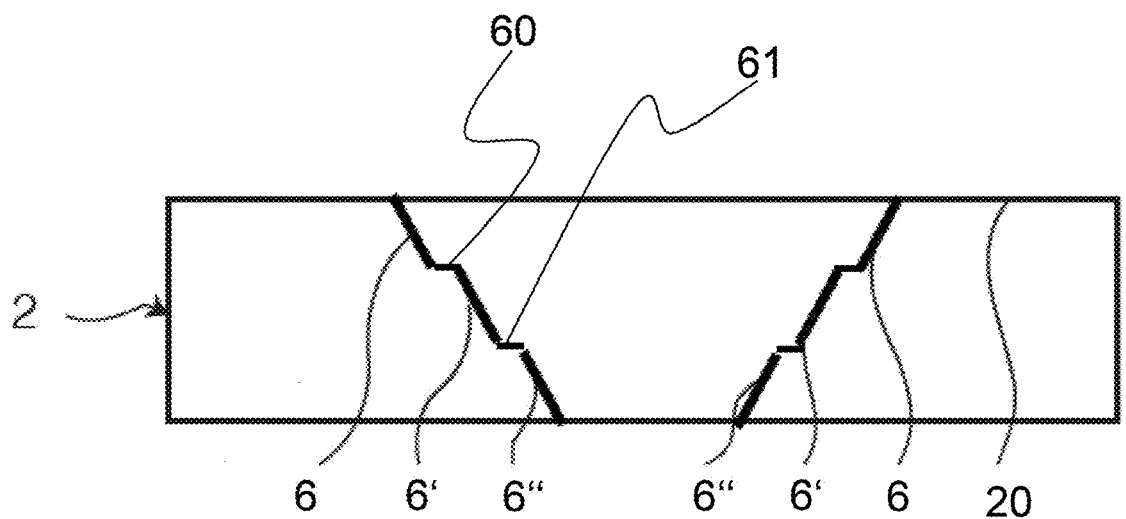
FIG. 7 shows a cross-sectional view through a glass or glass ceramic element with stepped defects.

FIG. 7 shows a glass or glass ceramic element 2 having a surface 20. A laser beam was injected obliquely to the surface 20 so as to produce filamentary damages 6, 6', 6" in the interior of the glass or glass ceramic element 2. In this case, the laser beam is passed multiple times along the contour of the portion to be detached and is focused at respective different depths. At the same time, the laser beam is offset laterally. Therefore, damages 6, 6', 6" created along the respective paths are arranged in stepped manner. Damages 6" correspond to the lowest step or level. Damages 6' are at the next higher level, followed by the level at which damages 6 are located. The individual steps 6, 6', 6" which extend obliquely relative to faces 25, 26, due to the oblique injection of the laser beam, are preferably introduced from bottom to top, that means that during the implementation of the method according to the invention the laser beam is guided from a more inward to a more outward position with respect to glass element 2. Steps 6, 6', 6" are interconnected through landings 60, 61.

Furthermore, as can also be seen in FIG. 7, the inclination at these steps is greater than the average inclination of edge surface 24, according to a preferred embodiment of the method. From one face to the opposite face, the steps successively project further outwards or inwards, depending on from which of the faces one starts.

This stepped introduction of filamentary damages is particularly suitable for rather thick glass or glass ceramic elements. According to one embodiment of the invention it is therefore contemplated that such a stepped edge surface is provided in or introduced into a glass or glass ceramic element that has a thickness of at least 10 millimeters.

Figure 8:
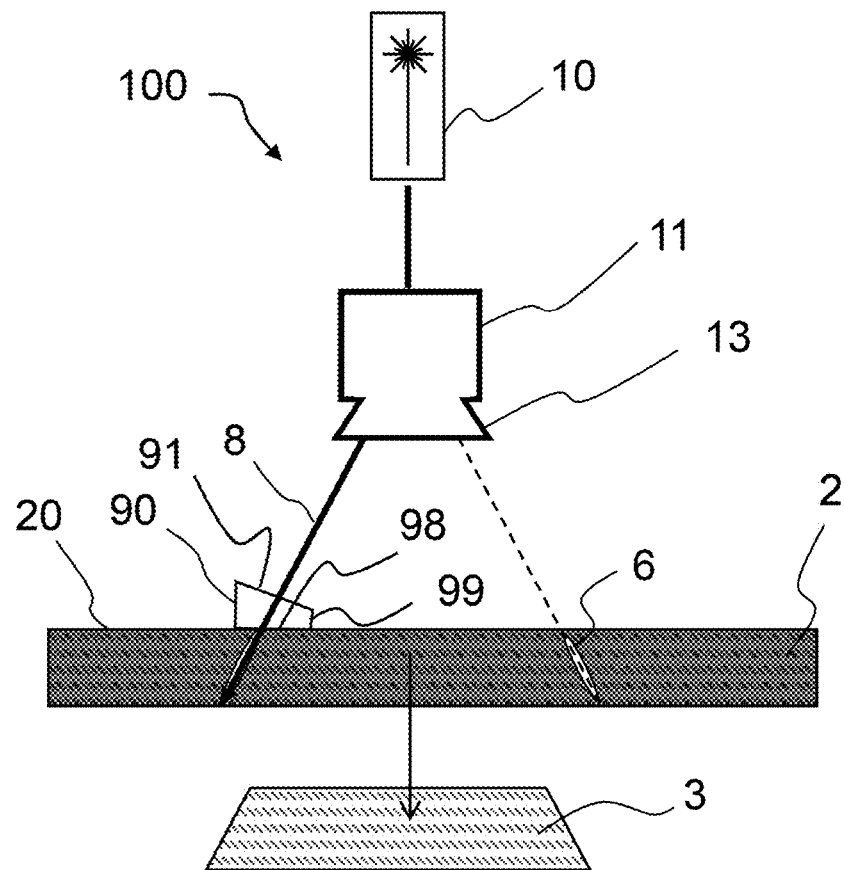
FIG. 8 is a schematic side view of a further embodiment of a laser processing device for processing rather thick glass or glass ceramic elements with a prism placed thereon.

A further embodiment of the method according to the invention is schematically illustrated in FIG. 8 by way of a laser processing device 100 in which a rather thick glass or glass ceramic element 2 is microperforated by introducing oblique filamentary damages 6.

In addition to an ultrashort pulse laser 10 and a scanner 11, the laser processing device 100 comprises an optical element 99 for directing the laser beam. The optical element is distinguished by at least two planar surfaces, with the laser beam entering the optical element through a first planar surface and exiting the optical element through the second planar surface. In the present example, this is an optical prism or a dispersion prism. The optical element thus essentially has the function of directing the laser beam as a result of refraction at the respective boundary surfaces of the optical element, that is to say on the first and second planar surfaces of the optical element in the present example. The optical element 99 is therefore arranged in the beam path of the laser radiation 8.

In the illustrated embodiment, a wedge prism 90 is provided, which has a first prism surface 91 through which the laser radiation 8 enters, and a second prism surface 98 through which the laser radiation exits. Prism surfaces 91, 98 therefore define the refracting faces. The wavelength of ultrashort pulse laser 10 is again chosen such that the laser pulses 8 can penetrate into and pass through the glass or glass ceramic element 2.

This optical system of laser processing device 100 including the optical element 99 is used to compensate the angle of incidence which is resulting between the direction of the laser beam 8 obliquely towards the surface 20 of the glass or glass ceramic element and the surface normal. The inclination of the surface 20 facing the laser beam can be compensated thereby.

The wedge angle of the prism is chosen so that no total reflection of the laser radiation occurs. The prism is made of an optical glass, in the present example of the optical glass "N-BK7", available from SCHOTT, Mainz. It may also be made of quartz glass. In order to avoid undesired reflections of the laser radiation 8, an antireflective coating is favorably applied to the refractive surfaces 91, 98 of the prism. The antireflective coating is advantageously adapted to the wavelength of the laser radiation 8 in order to prevent unwanted reflections of the laser radiation 8 at the refractive surfaces of the prism. For example, a suitable coating may be a broad anti-reflective coating for a wavelength from 1050 to 1700 nm.

The great advantage of such an arrangement lies in the fact that it allows to counteract a distortion of the laser beam 8 due to refraction at the interface of the glass or glass ceramic element in the case of rather thick workpieces and starting points for the filamentary damages 6 inside the glass or glass ceramic element 2. This distortion becomes particularly important when angles of incidence of more than 5°, in particular more than 10°, more than 12°, more than 15°, or more than 20° are desired in rather thick glass or glass ceramic elements.

Here, rather thick workpieces are to be understood as meaning workpieces that have a thickness of more than 2 mm, more than 4 mm, more than 6 mm, or even more than 8 mm. In the case of such rather thick workpieces, distortion is particularly important if filamentary damage are desired to be produced at a depth of more than 1.5 mm, more than 2 mm, more than 3 mm, or even more than 4 mm as seen from the surface 20 of the glass or glass ceramic element 2 through which the laser radiation 8 enters.

Such distortions can lead to intensity losses in plasma generation and thus to a reduction in length of the filamentary damage channels 6 in the direction of the laser radiation. This effect arises in particular in glass or glass ceramic elements 2 having a thickness of more than about 4 mm. Due to the reduction in length of the filamentary damage channels 6, considerably more passes have to be performed over the points to be perforated along the separation line at different depths in the volume of the glass or glass ceramic element 2, resulting in lower efficiency.

The prism 90 of laser processing device 100 thus allows to process even glass or glass ceramic elements with a thickness of 4 mm or more, even in case of an inclination of the laser radiation 8 relative to the surface normal of more than 5°, more than 10°, more than 12°, more than 15°, or even more than 20°. It is thus possible to produce such oblique filaments even at a depth of more than 1.5 mm, more than 2 mm, more than 3 mm, or even more than 4 mm as seen from the surface 20 of the glass or glass ceramic element 2.

The optical element 99, i.e. the wedge prism 90 in the present example, is placed in the beam path of laser radiation 8, and the wedge angle of wedge prism 90 is chosen so as to just compensate the inclination of the surface 20 of the glass or glass ceramic element 2 facing the laser beam 8.

In order to minimize the influence of refraction at the exit from the wedge prism 90 and subsequent entry into the glass or glass ceramic element, the wedge prism 90 and the glass or glass ceramic element 2 are in full-surface contact with each other, with the second prism surface 98 resting on surface 20.

The further influence of refraction at this media interface is now determined by the remaining difference or the quotient of the refractive indices between the prism material and the substrate material. Here, it can be assumed that the difference in the refractive indices between the optical glasses used for the optical elements and the glass or glass ceramic element to be processed is in an order of magnitude of $\Delta n/n \leq 0.1$, preferably $\Delta n/n \leq 0.05$, more preferably $\Delta n/n \leq 0.01$.

In a further embodiment, the optical element 99, i.e. the prism 90 in the present example, is made of the same material as the glass or glass ceramic element 2, so that the laser beam 8 enters the glass or glass ceramic element 2 at the media interface without refraction and thus without further distortion of the wavefronts. Thus, the characteristic intensity distribution of the Bessel beam which is necessary for the introduction of the filament into the glass or glass ceramic element 2 can be provided.

Figure 12:
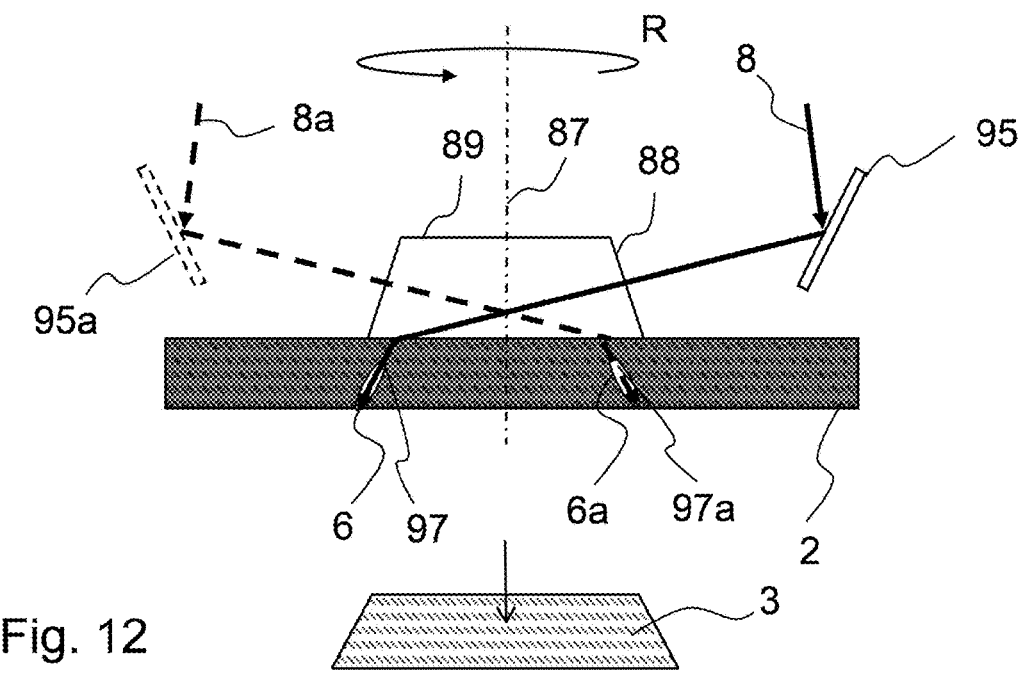
FIG. 12 schematically illustrates an optical arrangement in which a cut can be produced along a circular conic surface using a laser beam.

In yet another embodiment, a truncated cone prism is used instead of the prism resting on the surface, which has its lateral surface aligned such that no refraction occurs when the laser beam 8 enters the truncated cone, i.e. vertical incidence is provided. By using suitable optical setups, for example an x-y scanner and an annular mirror, or a mirror rotating around the truncated cone, the laser beam 8 can be guided over the surface of the truncated cone along a circular conic section with vertical incidence while avoiding refraction upon entry into the truncated cone. FIG. 12 shows an arrangement for such an embodiment.

Thus, a circular preliminary damage consisting of filaments will be produced in the glass or glass ceramic element 2, with flank angles extending obliquely relative to the substrate surface, and with a length that is greater than 200 μm, preferably greater than 500 μm, and most preferably greater than 1000 μm, to the small impact of the refraction at the material interfaces on the wavefronts of the generating laser beam, and with an inclination relative to the normal of the substrate surface of more than 5°, more than 10°, more than 12°, more than 15°, or even more than 20°. Here, in the case of glass or glass ceramic elements having a thickness of more than 4 mm, more than 6 mm, or even more than 8 mm, the filamentary damage will lie in a depth of the glass or glass ceramic element 2 of more than 1.5 mm, more than 2 mm, more than 3 mm, or even more than 4 mm as seen from the surface 20.

General disadvantages of devices for producing filaments in glass or glass ceramic elements 2, in which the injecting optical elements are in full-surface contact to the surface of the element are, on the one hand, the problems resulting from the contact of the adjoining surfaces in terms of friction of the surfaces against each other and the associated abrasion of these surfaces, i.e., more generally, damage to or alteration of the surfaces or their coatings due to the contact or any existing relative movements. On the other hand, there is a risk of damaging the injecting component itself by the method per se, for example if the starting point of the filament to be produced is close to the surface or in or above the surface.

Therefore, in a further embodiment of the invention, a gap of a predetermined thickness s is kept between the surface 20 and the surface of the injecting optical element 99 facing this surface, in order to ensure the integrity of the surfaces. Surprisingly, it was found in this way that it is possible, by an additional slight tilting of the second prism surface by suitably selecting the wedge angle of the prism, to minimize the influence of the refraction on the wavefronts of the collimated or focused laser beam 8, as already described above, in terms of generation of astigmatic errors and the associated influence on the intensity distribution of the beam, i.e. the arising of secondary maxima in addition to the main maximum of the Bessel beam.

Figure 9A:
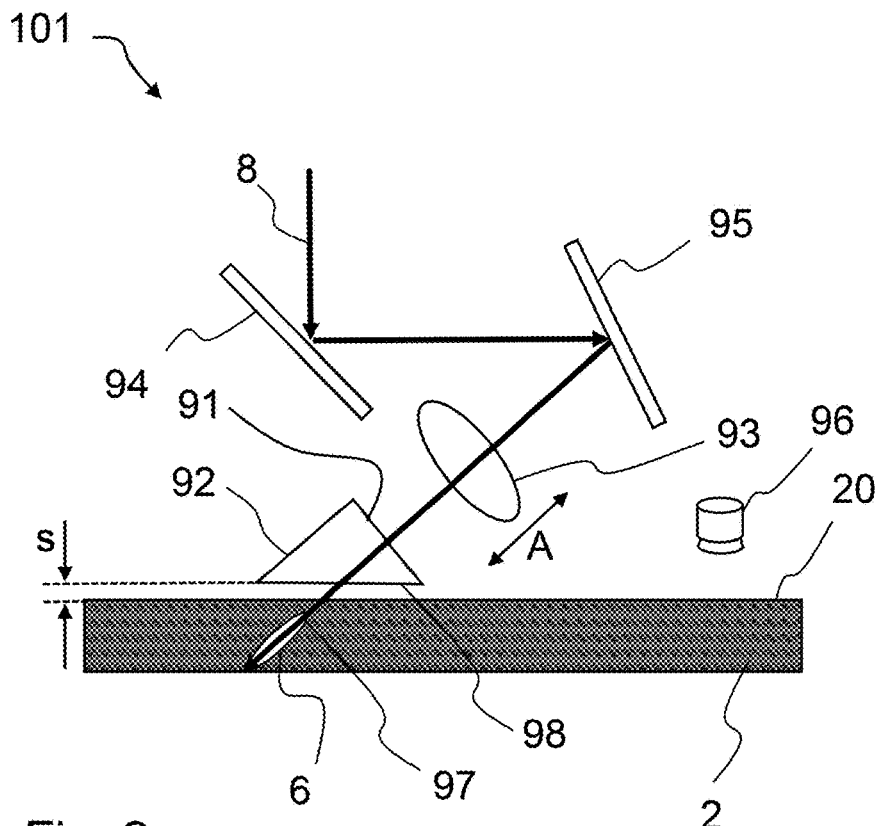
FIG. 9a shows a schematic side view of a further embodiment of a laser processing device for processing rather thick glass or glass ceramic elements with a spaced-apart prism.
Figure 9B:
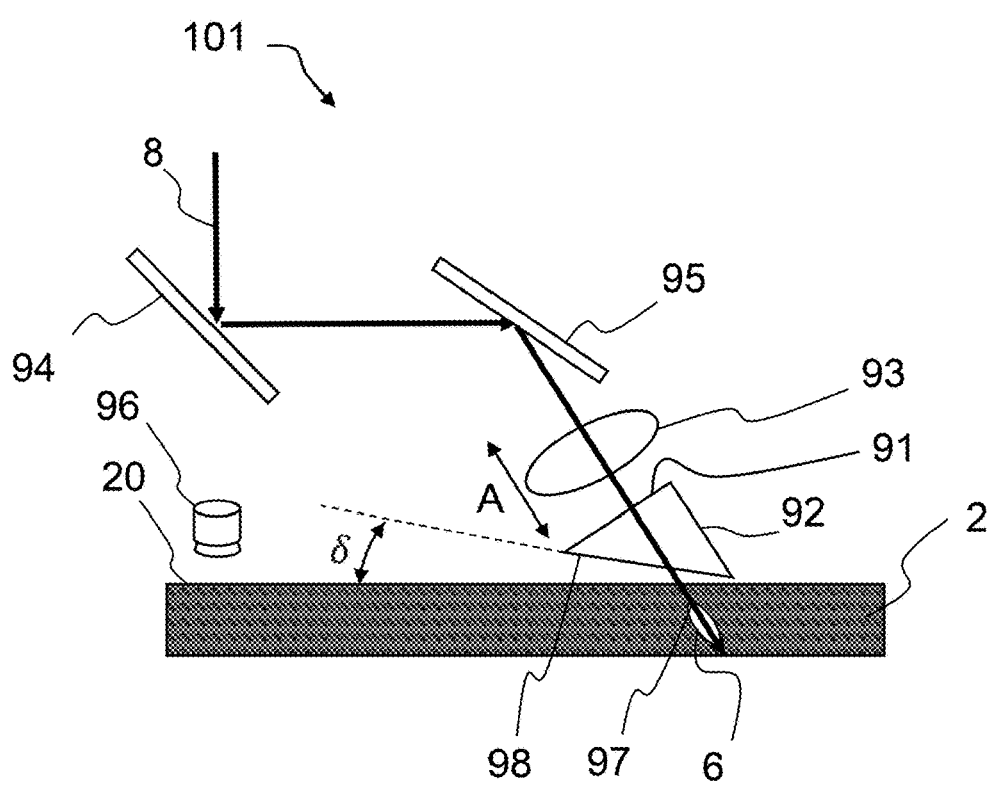
FIG. 9b is a schematic side view of an embodiment of a laser processing device for processing rather thick glass or glass ceramic elements with a spaced-apart prism.

Such a likewise preferred embodiment of a laser processing device 101 for processing rather thick glass or glass ceramic elements 2 that have a thickness of more than 4 mm, more than 6 mm, or even more than 8 mm is schematically shown by FIGS. 9*a* and 9*b*, in a respective side view. For the sake of clarity, the illustration of the ultrashort pulse laser and the laser scanner has been omitted in FIGS. 9*a* and 9*b*. The wavelength of the ultrashort pulse laser 10 for generating laser radiation 8 is again selected such that the laser pulses 8 can penetrate into the glass or glass ceramic element 2.

The schematically illustrated laser processing device 101 comprises an optical element in the form of an optical prism 92. The latter is arranged in the beam path of laser radiation 8 such that the laser radiation is incident perpendicular to the first prism surface 91 of prism 92 which surface 91 faces the laser radiation 8. Appropriately, prism 92 is provided with an antireflective coating, as discussed above.

In order to address the disadvantage of placing the prism 92 in full-surface contact with the surface 20 of glass or glass ceramic element 2, as shown in the exemplary embodiment of laser processing device 100, a gap s of predetermined size is provided in the laser processing device 101 between the second prism surface 98 of prism 92 facing the surface 20 of the glass or glass ceramic element and this same surface 20. Accordingly, prism 92 and surface 20 of glass or glass ceramic element 2 are not in direct contact in this embodiment.

Figure 10:
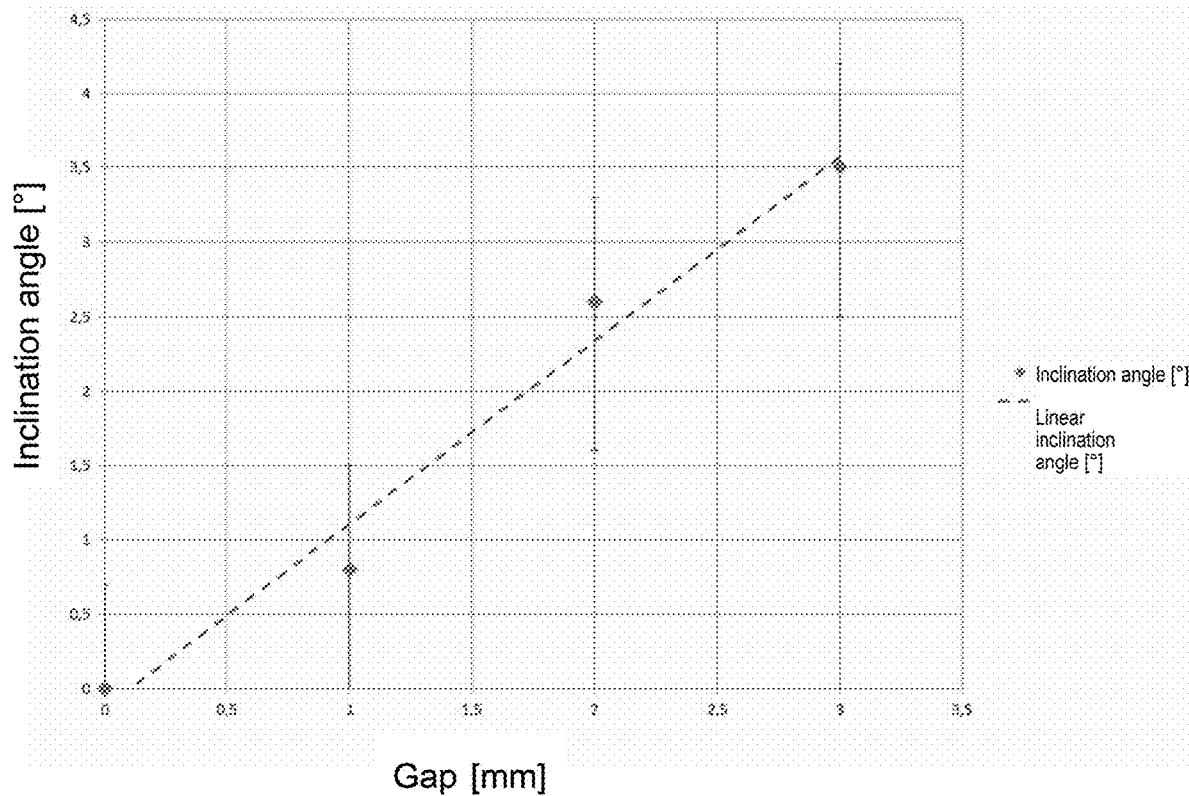
FIG. 10 illustrates the functional relationship between the path of the light beam in the air gap and the angle of inclination of the second prism surface with respect to the substrate surface.

The functional relationship, as determined experimentally or by simulation, between the local thickness of gap s and the optimum angle of the air wedge defined by the substrate surface 20 and the lower surface of the injecting prism is shown in FIG. 10 for a BK-7 prism, by way of example, without being restricted to a particular material.

It will be readily apparent to those skilled in the art that the real relationship will be influenced by the specific refractive indices of the paired materials; for example, instead of air in the gap, other media such as liquids may as well be used to match the refractive indices (index matching). A significant change in the relationships will not arise in this case.

The optical system of the illustrated laser processing device 101 further comprises two deflection mirrors 94, 95 and a focusing element 93. Due to the two deflection mirrors 94, 95 of the optical system, the laser processing device 101 becomes particularly flexible in use, for example with respect to the creation of oblique filamentary damage channels along a separation line in preparation for the separation of circular or rotationally symmetrical inner cutouts from a surrounding main part.

For this purpose, the two deflection mirrors 94, 95 are arranged so as to be tiltable about the transverse axis and also movable relative to each other in terms of their relative spacing. The optical system may also be arranged so as to be rotatable about its vertical and/or horizontal axis. Through the relative spacing of the two deflection mirrors 94, 95 to each other it is then possible to adjust a radius for introducing the microperforations along a circular separation line, for example, in order to produce a circular inner cutout with oblique edges. For this purpose, the deflecting mirror 94 arranged upstream in the beam path deflects the laser radiation 8 onto the deflection mirror 95 downstream in the beam path. The angle of inclination of this latter deflection mirror 95 is matched with the wedge angle of prism 92 and is adapted such that the laser radiation 8 is preferably incident perpendicular onto the surface 91 facing the laser radiation.

Due to the spacing between the optical element 99 and the surface 20 of glass or glass ceramic element 2, further refraction of the laser radiation 2 will be caused at the respective refractive surfaces when the laser radiation passes through the optical element 99 and enters the glass or glass ceramic element 2.

The angle adjustment of the deflection mirror can be used very advantageously to adjust the beam direction caused by the refraction in such a manner that a predetermined angle of inclination of the damage channels is achieved in the glass or glass ceramic element 2.

The focusing element 93, which may, for example, be a collimator lens, serves to define the starting point 97 of the filamentary damage channel 6 in the glass or glass ceramic element 2. It is arranged in the beam path of the laser radiation before the latter passes through the prism 92. Conveniently, for this purpose, the focusing element 93 is arranged so as to be movable along the beam direction. In the example, the direction of displacement is indicated by A. This makes it possible to easily predetermine the respective starting point 97 of the damage channel in the glass or glass ceramic element 2 for each processing step.

A rotationally symmetrical inner cutout can be produced in a glass or glass ceramic element by rotating the optical system including deflection mirrors 94, 95, focusing element 93, and dispersion prism 92 around the surface normal 21.

The side view of a laser processing device 101 schematically illustrated in FIG. 9*b* shows an operating state in which the laser radiation is directed towards a different direction due to the tilting of deflection mirror 95, for example in order to produce a rotationally symmetrical inner cutout. Focusing element 93 and prism 92 are also moved synchronously in this case, so that the laser radiation 8 will always pass through these elements.

Furthermore, in the laser processing device 101 shown in FIG. 9*b*, the second prism surface 98 is tilted, by an angle of inclination $\delta$, relative to the surface 20 of glass or glass ceramic element 2. This serves to further influence the direction of the laser radiation.

The functional relationship between the path of laser beam 8 in air gap s and the angle of inclination $\delta$ of the second prism surface 98 relative to surface 20 furthermore means that a dependency exists on the point of incidence of the laser beam on the first prism surface 91, because when the lateral position of the beam on prism surface 91 changes, the geometric and optical path length of the beam in the air wedge between prism 92 and the glass or glass ceramic element 2 will change accordingly, so that the angle of inclination δ of the prism and thus also the alignment of the upstream mirror has to be changed.

FIG. 10 shows the functional relationship between the path of the laser beam 8 in the air gap and the angle of inclination δ of the second prism surface relative to the substrate surface. For example, for a gap s of 2 mm, a favorable inclination angle δ in a range from 1.6° to about 3.3° is apparent from the graph.

In a further embodiment of the invention, the functional relationship between the optimized angle of inclination δ and the optical path length is therefore used to adjust, by integration, the shape of the ideal rear exit surface such that the required relationship in terms of spacing and angle is automatically met. The surface shape is obtained by suitable polishing processes.

In order to produce the longest possible filamentary damage channels 6 in the glass or glass ceramic element 2, in particular in greater depths of the glass or glass ceramic element 2 as well, it is important that the laser radiation 8 forms an intensity maximum without causing rather large secondary maxima to arise. This is influenced by the spacing s between prism 92 and the surface 20 of glass or glass ceramic element 2, the wedge angle of the prism, and the inclination angle δ of the prism.

The inclination angle δ which causes an intensity maximum of the laser radiation can then be determined as a function of the material of the prism, the wedge angle of the prism, the spacing s between the prism and the surface of the glass or glass ceramic element, and/or the wavelength of the ultrashort pulse laser radiation.

In such a configuration, the spacing s refers to the distance measured between the exit point of the laser radiation 8 from prism 92 and the entry point of the laser radiation 8 into the surface 20 of glass or glass ceramic element 2.

In a likewise preferred embodiment, a distance sensor 96 is provided, for example a confocal distance sensor, for automatically determining the spacing s between prism 92 and the surface 20 of glass or glass ceramic element 2. In such an embodiment of a laser processing device 101 it is possible, for example, to predefine a fixed inclination angle δ between prism 92 and surface 20, and to control the spacing s between prism 92 and surface 20 to take an optimum value, using the distance sensor 96.

Therefore, it is contemplated according to a further aspect of the invention that the spacing between the glass or glass ceramic element 2 and the optical system comprising the deflection mirrors 94, 95, the focusing element 93 and the prism 92 is variable. With suitable control means of the laser processing device it is very easily possible in this manner to produce complex filamentary structures in different depths of the glass or glass ceramic element 2.

Figure 11:
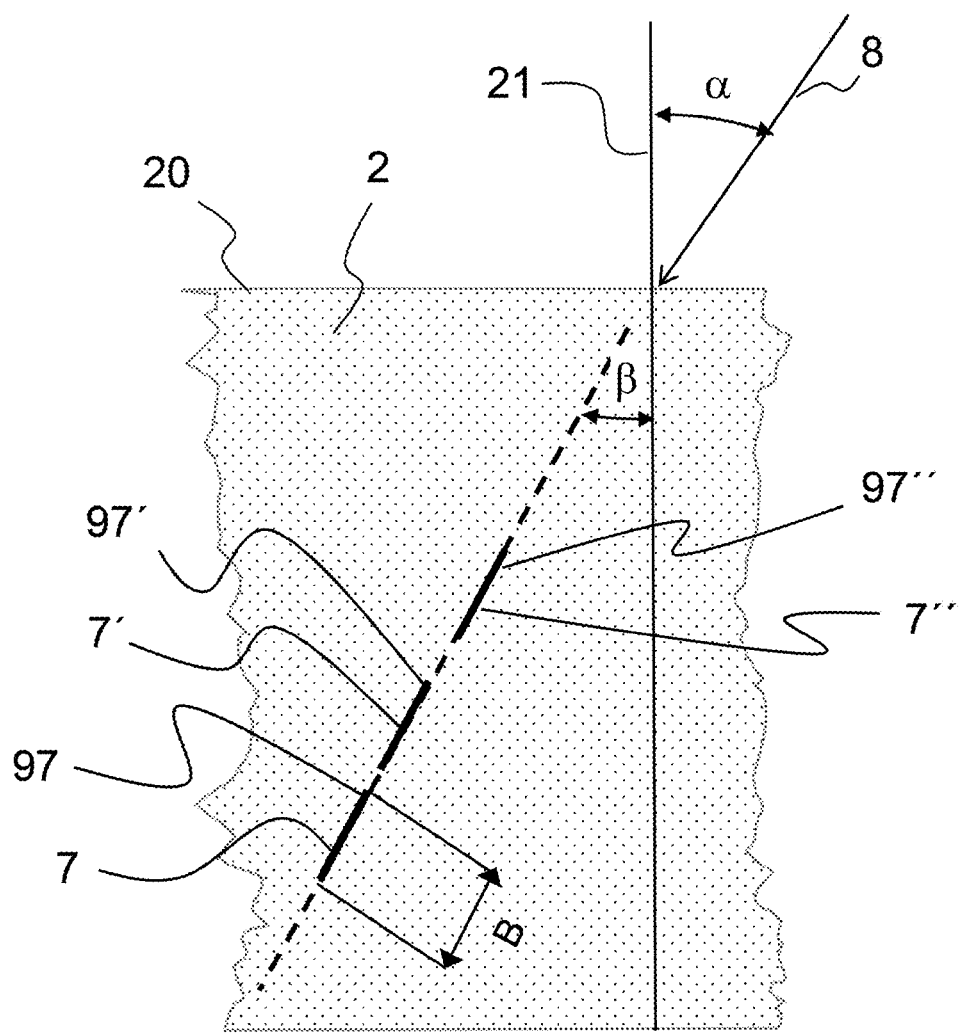
FIG. 11 is a schematic sectional view through a glass or glass ceramic element with filamentary damage channels which are introduced at different depths of the substrate.

FIG. 11 is a schematic sectional side view through a glass or glass ceramic element 2. The figure shows a total of three filamentary damage channels 7, 7', 7" arranged collinearly with each other, each one emanating from a respective starting point 97, 97', and 97" and extending into the depth of the element, with a longitudinal extension along the beam direction of the laser pulse 8. These three damage channels were created with a total of three passes. The length of such a damage channel is indicated by B. In total, three filamentary damage channels 7, 7', 7" each having a length of about 500 to 600 micrometers were produced in a glass element 2 of 8 mm thickness, with a starting point of damage channels 97' and 97" in the lower half of the glass element 2 and therefore at a depth of more than 4 mm as seen from the surface 20 on which the laser radiation 8 enters the glass element 2.

In this way it is possible to produce filamentary damage channels of equal length at different depths of the glass or glass ceramic element 2 using constant ultrashort pulse laser radiation.

According to this embodiment of the invention it is possible with the laser pulses 8 to generate oblique filamentary damages 6, 7 with a length of at least 200 micrometers, preferably at least 500 micrometers, wherein the angle between the direction of light incidence of the laser pulses and the surface normal, i.e. the inclination of the longitudinal axis of the damage channels relative to the surface normal, is more than 5°, more than 12°, more than 15°, or even more than 20°.

Finally, FIG. 12 schematically shows an optical arrangement in which a cut can be produced along a circular conic surface using the laser beam 8. In this embodiment, a truncated cone prism 89 is used, which is placed on the surface and has its lateral surface 88 aligned such that no refraction occurs when the laser beam 8 enters the truncated cone, i.e. under perpendicular incidence. The base surface of truncated cone prism 89 is planar and is in full-surface contact with the surface 20 of the glass or glass ceramic element 2.

The optical arrangement shown in FIG. 12 only illustrates part of a laser processing device. With the schematically illustrated arrangement it is possible to separate a truncated cone-shaped portion 3 from a thick glass or glass ceramic element 2.

For controlling the beam direction, a mirror 95 is provided which directs the laser beam 8 onto the lateral surface 88 of the truncated cone prism such that it is incident perpendicular to the lateral surface 88. In this case, deflection mirror 95 rotates about a rotation axis 87 in a direction indicated by "R", which coincides with the cone axis of truncated cone prism 89. An x-y scanner (not illustrated) is provided and adapted to direct the laser beam 8 onto deflection mirror 95 during the rotation such that the laser radiation 8 is incident on lateral surface 88 always at the same angle.

For the sake of better illustration, a further position 95a of the deflection mirror is shown in dashed lines in FIG. 12, in which the mirror is rotated by 180° about the axis of rotation 87 compared to the position 95 of the deflection mirror. With this position, the laser beam 8a is incident on the lateral surface 88 at a position that is also rotated by 180°, and generates the filamentary damage 6a starting from starting point 97a of the filamentary damage.

With this arrangement, the laser beam 8, 8a can be directed along the circular conic cut surface, while being passed over the lateral surface of the truncated cone under vertical incidence, thereby avoiding refraction when entering the truncated cone prism 89. With multiple rotations about the axis of rotation 87 it is possible in this way to produce the filamentary damages 6 at different depths even in case of rather thick glass or glass ceramic elements 2.

A laser processing device 100, 101 can be used to produce collinear microperforations as well as offset microperforations in glass or glass ceramic elements that have a thickness of 1 mm or more. It was even possible to process a glass and glass ceramic element with a thickness of more than 4 mm or even up to 8 mm or even more.

Without being limited to the exemplary embodiments, a laser processing device 100, 101 for preparing separation of a portion 3 from a glass or glass ceramic element 2 is moreover contemplated according to a further aspect of the invention, which laser processing device comprises a prism 90, 92, in addition to the components of laser processing device 1.

It will be apparent to a person skilled in the art that the invention is not limited to the examples explained above, but that rather the individual embodiments of the invention can be combined with each other. For example, an opening 23 can be produced which is not delimited by a completely circumferential edge surface 24. Such an opening may as well be provided in a peripheral area of the glass or glass ceramic element 2 so that the oblique edge surface 24 merges into the edge of the element, or so that the opening 23 opens to a lateral side so as to have the shape of a recess in the peripheral area of the glass or glass ceramic element. Furthermore, the embodiment of FIG. 5 is shown with only one row of filamentary damages 6 extending along the edge surface 24. However, as explained above, with appropriate focusing it is possible for the damages to be produced at different depths, in particular in case of rather thick glass or glass ceramic elements 2. In this way, two or more of such rows of adjacent filamentary damages 6, 7 will be resulting, with the rows aligned one above the other on the edge surface 24, i.e. with a respective different spacing to one of the edges 27, 28.

LIST OF REFERENCE NUMERALS

| | |
|---|---|
| 1 | Laser processing device |
| 2 | Glass or glass ceramic element |
| 3 | Portion to be or already separated from 2 |
| 4 | Separation line |
| 6, 6a, 7 | Filamentary damage |
| 8, 8a | Laser pulse |
| 10 | Ultrashort pulse laser |
| 11 | Scanner |
| 13 | Focusing means |
| 15 | Switch button |
| 20 | Surface of 2 |
| 21 | Surface normal of 20 |
| 23 | Opening |
| 24 | Edge surface |
| 25, 26 | Faces |
| 27, 28 | Edge |
| 60, 61 | Landings |
| 80 | Point of incidence of laser pulse 8 on surface 20 |
| 82 | Light incidence plane |
| 87 | Rotation axis |
| 88 | First prism surface |
| 89 | Truncated cone prism |
| 90 | Wedge prism |
| 91 | First prism surface |
| 92 | Prism |
| 93 | Focusing element |
| 94 | Deflection mirror |
| 95, 95a | Deflection mirror |
| 96 | Distance sensor |
| 97 | Starting point of filamentary damage |
| 97a | Starting point of filamentary damage |
| 98 | Second prism surface |
| 99 | Optical element |
| 100, 101 | Laser processing device |

What is claimed is:

1. A method for separating portions from a glass or glass ceramic element, comprising:
    producing filamentary damages in a volume of the glass or glass ceramic element, the filamentary damages being adjacently aligned along a separation line and having a longitudinal extension that extends obliquely relative to a surface of the glass or glass ceramic element; and
    separating a portion from the glass or glass ceramic element along the separation line so that an oblique edge extends from the surface to an opposite surface of the glass or glass ceramic element, where the glass or glass ceramic element has a thickness from the surface to the opposite surface of greater than 10 mm, and where the oblique edge is angled with respect to the surfaces by more than 5°,
    wherein the step of producing the filamentary damages comprises:
        directing laser pulses of an ultrashort pulse laser obliquely on the surface so that the laser pulses have a light propagation direction that extends obliquely relative to the surface and so that the filamentary damages resulting from the laser pulses have the longitudinal extension that extends obliquely relative to the surface,
        generating a plasma within the volume with the laser pulses, wherein the glass or glass ceramic element comprising a material that is transparent to the laser pulses, and
        displacing the laser pulses at points of incidence over the surface along the separation line, wherein the separation line extends obliquely to a light incidence plane of the laser pulses.

2. The method as in claim 1, further comprising passing the laser pulses through a beam directing optical element before being directed on the surface, the beam directing optical element having at least two planar surfaces through which the laser pulses enter and exit.

3. The method as in claim 2, wherein the optical element is a prism.

4. The method as in claim 3, further comprising passing the laser pulses through a focusing element before the laser pulses are incident on the prism, wherein the focusing element is arranged so as to be movable in the light incidence direction of the laser pulses.

5. The method as in claim 2, further comprising selecting a refractive index of the optical element with a difference to a refractive index of the material of the glass or glass ceramic element with an order of magnitude of 66 n/n≤0.1.

6. The method as in claim 1, further comprising arranging two deflection mirrors in a beam path of the laser pulses with a variable spacing to each other.

7. The method as in claim 1, wherein the laser pulses are emitted at a repetition rate of less than 400 kHz.

8. The method as in claim 1, wherein laser pulses deposit an energy in the glass or glass ceramic element that is more than 80 µJ.

9. The method as in claim 1, further comprising adjusting an angle in a range from 3° to 30° between the light propagation direction of the laser pulses and a surface normal to the surface of the glass or glass ceramic element.

10. The method as in claim 1, wherein the filamentary damages have a length along the longitudinal extension of at least 200 micrometers.

11. The method as in claim 1, wherein the step of directing the laser pulses comprises operating the ultrashort pulse laser in a burst mode to emit pulse packets, where each of the pulse packets produces one of the filamentary damages.

12. The method as in claim 1, wherein the step of displacing the laser pulses comprises passing the laser pulses over each point of incidence at least two times and modifying a focal depth of the laser pulses in order to introduce the filamentary damages into the glass or glass ceramic element at different depths.

13. The method as in claim 12, wherein the passing at least two times further comprises adjusting an angle of inclination and/or a lateral offset of the laser beam between passes of the laser pulses so that the filamentary damages are arranged collinearly in the longitudinal extension, without significant lateral offset in the light propagation direction.

14. The method as in claim 12, wherein the passing at least two times further comprises modifying a focal depth with respect to a previous pass and offsetting a position of the point of incidence as a function of the focal depth such that the focal points lie on a straight line during the passes.

15. The method as in claim 14, wherein the position is offset in a direction perpendicular to the separation line by an amount of V=d·tan α, wherein d is the change in focal depth, α is the angle of light incidence, and V is an offset of the position of a point of incidence.

16. The method as in claim 15, wherein the passing at least two times further comprises creating a stepped layering of the filamentary defects due to the offset.

17. The method as in claim 1, wherein the oblique edge is angled with respect to the first surface by more than more than 20°.

18. A method for separating portions from a glass or glass ceramic element, comprising:
producing filamentary damages in a volume of the glass or glass ceramic element, the filamentary damages being adjacently aligned along a separation line and having a longitudinal extension that extends obliquely relative to a surface of the glass or glass ceramic element; and
separating a portion from the glass or glass ceramic element along the separation line,
wherein the step of producing the filamentary damages comprises:
directing laser pulses of an ultrashort pulse laser obliquely on the surface so that the laser pulses have a light propagation direction that extends obliquely relative to the surface and so that the filamentary damages resulting from the laser pulses have the longitudinal extension that extends obliquely relative to the surface,
generating a plasma within the volume with the laser pulses, wherein the glass or glass ceramic element comprising a material that is transparent to the laser pulses, and
displacing the laser pulses at points of incidence over the surface along the separation line, wherein the separation line extends obliquely to a light incidence plane of the laser pulses, wherein the step of displacing the laser pulses comprises passing the laser pulses over each point of incidence at least two times and modifying a focal depth of the laser pulses in order to introduce the filamentary damages into the glass or glass ceramic element at different depths,
wherein the passing at least two times further comprises modifying a focal depth with respect to a previous pass and offsetting a position of the point of incidence as a function of the focal depth such that the focal points lie on a straight line during the passes, and
wherein the position is offset in a direction perpendicular to the separation line by an amount of V=d·tan α, wherein d is the change in focal depth, α is the angle of light incidence, and V is an offset of the position of a point of incidence.

19. The method as in claim 18, wherein the passing at least two times further comprises creating a stepped layering of the filamentary defects due to the offset.

20. A method for separating portions from a glass or glass ceramic element, comprising:
producing filamentary damages in a volume of the glass or glass ceramic element, the filamentary damages being adjacently aligned along a separation line and having a longitudinal extension that extends obliquely relative to a surface of the glass or glass ceramic element; and
separating a portion from the glass or glass ceramic element along the separation line,
wherein the step of producing the filamentary damages comprises:
directing laser pulses of an ultrashort pulse laser obliquely on the surface through a beam directing optical element so that the laser pulses have a light propagation direction that extends obliquely relative to the surface and so that the filamentary damages resulting from the laser pulses have the longitudinal extension that extends obliquely relative to the surface,
maintaining a gap between a bottom planar surface of the optical element and the surface of the glass or glass ceramic element,
tilting of the bottom planar surface with respect to the surface,
generating a plasma within the volume with the laser pulses, wherein the glass or glass ceramic element comprising a material that is transparent to the laser pulses, and
displacing the laser pulses at points of incidence over the surface along the separation line, wherein the separation line extends obliquely to a light incidence plane of the laser pulses.

* * * * *